Figure 1A:
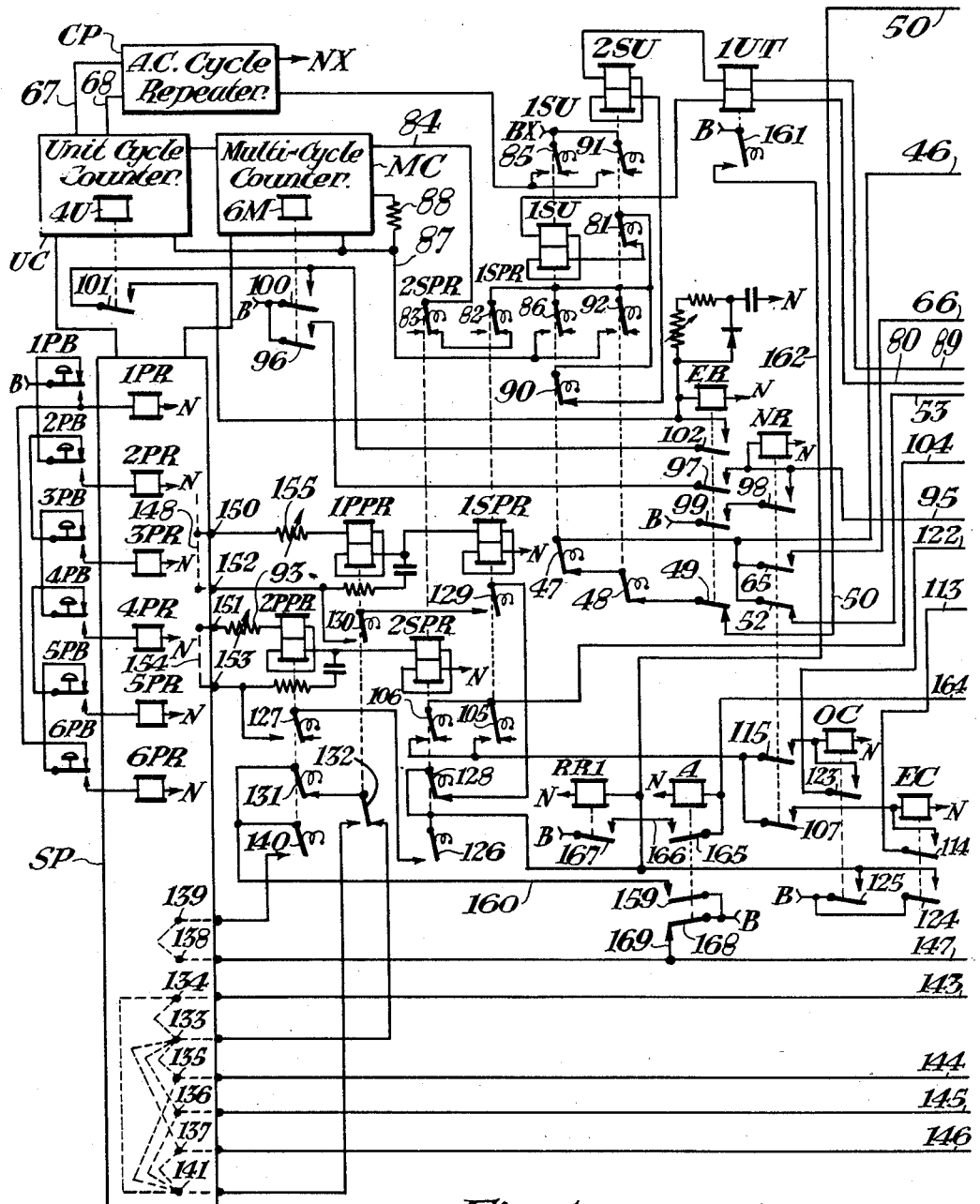

June 16, 1959 — M. YALICH ET AL — 2,891,144
CAR RETARDER SPEED CONTROL SYSTEMS
Filed July 11, 1955 — 2 Sheets-Sheet 1

Speed Pressure Circuit Network.

INVENTORS
Michael Yalich and
BY Joseph M. Berill.
W. L. Stout.
THEIR ATTORNEY

United States Patent Office 2,891,144
Patented June 16, 1959

2,891,144

CAR RETARDER SPEED CONTROL SYSTEMS

Michael Yalich, Penn Township, and Joseph M. Berill, Edgewood, Pa., assignors to Westinghouse Air Brake Company, Wilmerding, Pa., a corporation of Pennsylvania Application July 11, 1955, Serial No. 521,227

4 Claims. (Cl. 246—182)

Our invention relates to car retarder speed control apparatus, and particularly to means for controlling the operation of a car retarder in classification yards where a great number of the car units passing through the car retarder enter the car retarder at a low speed.

In railway hump classification yards where cars move down a hump track under the influence of gravity to different yard tracks, the speed at which cuts of cars or car units approach the yard tracks depends upon many factors, as, for example, the weight of the car and its contents, the condition of the car, weather, temperature, etc. The braking pressure or force exerted by the car retarder must therefore be varied for different car units so that the cars will leave the retarder at a correct speed to drift into the selected yard track and couple with the cars standing on the track without too great an impact. In the use of electro-pneumatic car retarders to control the leaving speed of a car unit, it has been found desirable to provide a predetermined initial pressure or braking force as the car enters the car retarder, and then reduce the initial pressure to a partial pressure as the speed of the car unit within the retarder is lowered to near the correct or desired leaving speed. As fully set forth in an application for Letters Patent of the United States, Serial No. 283,932, filed by Edward J. Agnew on April 23, 1952, for Car Retarder Speed Pressure Selective Control Apparatus, now Patent No. 2,727,138, issued December 13, 1955, and assigned to the assignee hereof, it has been found desirable to vary the initial pressure according to the desired leaving speed and vary the partial pressure to which the initial pressure is reduced according to the desired leaving speed, as well as the full release speed for different leaving speeds. The controls for the prior art car retarders are such that should a car unit within the retarder be moving at approximately the correct leaving speed, the car retarder is released to permit the car unit to roll freely, a speed-up of the car within the retarder bringing about a reapplication of the braking force.

In certain classification yards, a great many slow moving cars are handled which do not require the braking action of the car retarders since these cars move down the hump at speeds less than the desired leaving speed. The car retarders, which are normally in a closed position due to the initial pressure supplied to the brake cylinders are thus required to operate needlessly each time such a car enters the retarder. The opening of the closed retarder by slow moving cars expends the pressure supplied to the retarder and causes wear of the car retarder brake shoes which is otherwise unnecessary.

It is therefore an object of our present invention to provide a car retarder speed control system wherein a plurality of speed measuring sections are provided within the car retarder and whereby the brake shoes of the retarder are held to their open or released position while a speed measurement is made of the leading car wheels passing through the first car retarder measuring section.

Another object of our invention is to provide a car retarder speed control system of the character indicated wherein the initial and partial braking pressures selected for providing a predetermined leaving speed are applied upon completion of the initial speed measurement as the leading car wheels enter the second car retarder section should the car unit be moving at a speed greater than the desired leaving speed.

Still another object of the present invention is to provide a car retarder speed control system wherein the control of the car retarder is passed successively from the leading pair of car wheels to the next pair of car wheels only after the next pair of car wheels completely traverses a car retarder measuring section so that only a true speed measurement controls the subsequent braking action of the car retarder if required by the speed of the car unit moving through the retarder.

In carrying out our invention, the one rail of the track within the retarder is divided into a plurality of short insulated sections, each insulated section and the other continuous rail within the retarder forming a plurality of normally energized track circuits, each of the circuits comprising a holding circuit, a shunting circuit and a reset circuit. All the track circuits except the one for the leaving section are energized from a common direct current source. Each track relay is normally energized through its own front contact and a front contact of all the following track relays except the track relay for the leaving or last track circuit. That is to say, the normal holding circuit for each track relay branches off the original holding circuit from the positive terminal of the power source through its own front contact and winding and returns to the negative terminal of the source through a suitable individual current limiting resistor. The shunting circuit is formed for each track circuit by a connection from the positive terminal of the corresponding source to the common rail and thence through a pair of car wheels to the insulated rail of the corresponding section and to the junction terminal of the track relay winding with the individual resistor. The reset circuit means includes a back contact of the last section relay and a front contact of the other track relays in their ascending order. The track circuit for the last or leaving track section is a normally energized single rail circuit which is provided with its own track battery or source and is energized or deenergized in accordance with whether or not the section is shunted by a pair of car wheels.

Each of these insulated rail sections is relatively short and of a length such that no two pairs of car wheels and axles can overlap in the occupancy of any one track circuit. Also, the sections are preferably of the same length. By the holding, shunting and reset circuits of each track circuit, the shunting control is passed from the leading pair of car wheels to the next pair in the rear progressively until the last pair of wheels of a car passes beyond the leaving track section.

A suitable time measuring means is controlled by these track relays in such a manner as to initiate a new timing period as each track relay is shunted by a car passing through the sections. Hence, this time measuring means provides a time period which is the measure of the speed of the car in passing through the track section, the occupancy of which initiated the operation of the time measuring means. Control relays governed by the time measuring means are provided for establishing a control according to the extent it is moved during the occupancy of a section. The leading pair of wheels and axle of a car unit passing through the track sections have control of the time measuring means until the leading pair of wheels passes off the last section at which time the track relays are reset and the next pair of car wheels to the rear takes over control of the track relays and thus of the time measuring means. This operation is repeated for the successive pairs of car wheels until the car has completely passed beyond the track sections. When a pair of car wheels passes off the leaving track circuit and the next pair of wheels to the rear takes over control, this pair of wheels may have passed part way through the section occupied and thereby the timing mechanism will indicate a car speed greater than the actual speed due to the short length that the car wheels move during the operation of the time measuring means. This wrong speed measuring will effect a wrong control. Accordingly, the speed measuring operation by the time measuring means is not made effective until the pair of wheels to the rear which has taken over control enters the next track section. This delay in the speed measuring control is accomplished by providing an odd and an even cancellation relay which are associated with alternate track relays in such a manner that the initiating of an effective timing period by the time measuring means is delayed when a given control has been requested or a pair of wheels is passing over the leaving track section.

According to our invention, we provide an occupancy relay in the car retarder control circuits, the occupancy relay being picked up and held energized so long as pair of car wheels is within the speed measuring sections of the car retarder. We further provide a by-pass control relay which is normally deenergized but which upon entry of the leading car wheels into the second speed measuring section of the car retarder is energized and held energized over its own front contact and a front contact controlled by the occupancy relay. A holding circuit is also provided for the occupancy relay over the front contacts of the cancellation relays to prevent deenergization of the by-pass control relay before proper speed control is reestablished. A circuit established over a back contact of the by-pass relay for normally holding the car retarder in its open or released position is opened upon energization of the by-pass relay and another circuit established over a front contact of this relay to operate the car retarder to its closed position should the speed of the car unit be above the desired leaving speed.

Other objects and advantages of our invention will become apparent as the description proceeds.

We shall describe one form of apparatus embodying our invention and shall then point out the novel features thereof in claims.

Figure 1B:
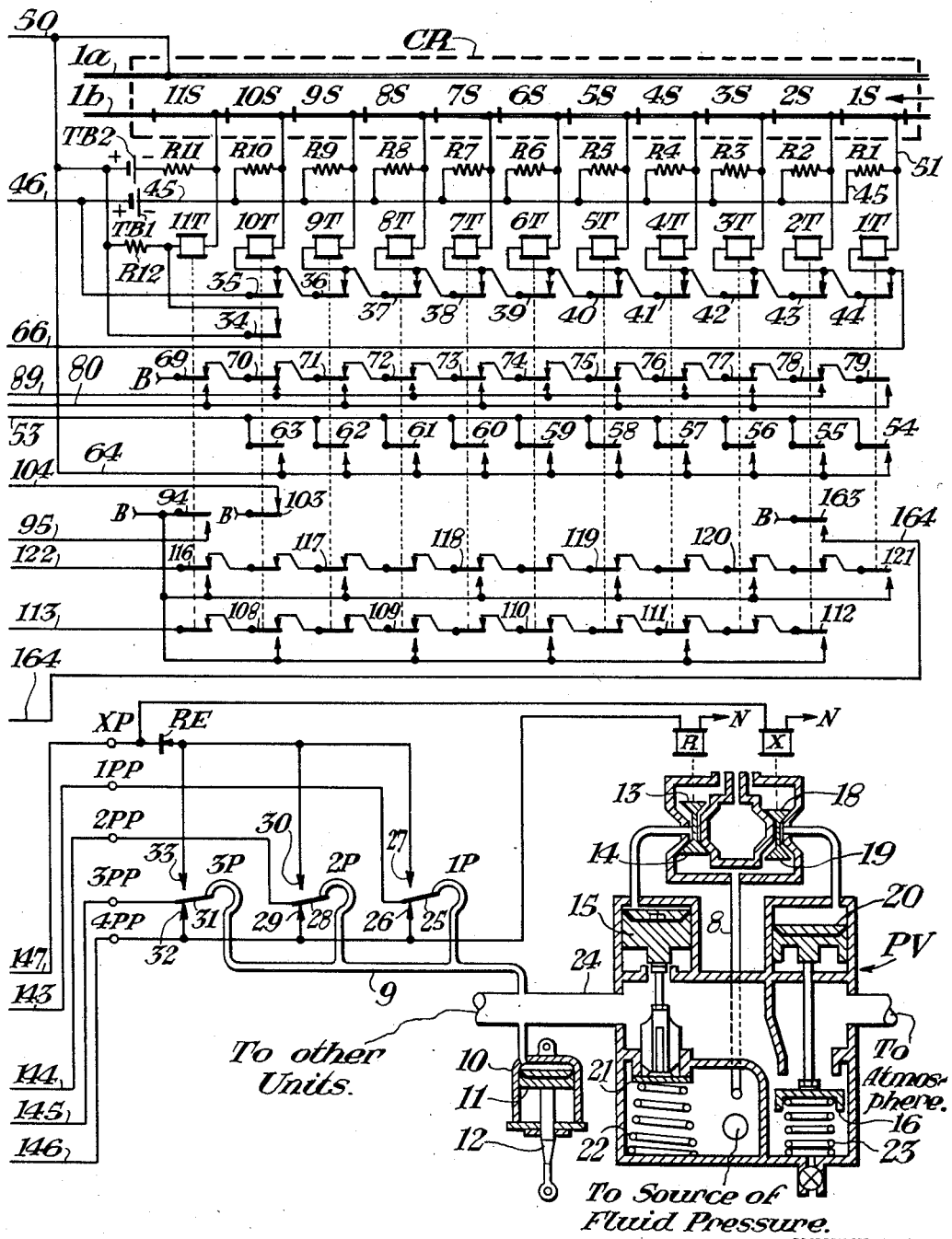

In the accompanying drawings, Figs. 1a and 1b, when placed side by side with Fig. 1a at the left, are a schematic view showing one form of apparatus embodying our invention when used with a car retarder.

Referring to the drawings, the reference characters 1a and 1b designate the rails of a stretch of railway track over which traffic normally moves in the direction indicated by an arrow and under conditions such that it is desirable to at times determine the speed of a vehicle or car and automatically establish a control according to the measured speed. For example, as here shown, this track is that leading from a hump to the yard tracks of a classification yard, the cars moving under the influence of gravity and it is desirable to control the speed of the car as it enters the selected classification track.

In order to control the speed of a car unit, the stretch of track illustrated in the drawings is provided with a car retarder CR. This retarder CR may be any standard type known to the art and since its specific structure forms no part of our invention it is indicated conventionally by a dotted rectangle. It is sufficient for the present application to point out that this retarder is provided with braking bars located on the opposite sides of each of the track rails 1a and 1b and operatively connected to motors for movement toward the rails for frictionally engaging the sides of the wheels of a car moving through the stretch of track to provide a braking force, the braking bars being also movable away from the rails to a position where they disengage the car wheels and provide no braking action. That is, these braking bars are movable to a so-called closed position where they brake the car wheels and to a so-called open position where they are disengaged from the car wheels. Furthermore, a motor means is provided for applying different forces to the braking bars and thereby varying the braking force exerted. For example, this car retarder may be similar to the widely used electro-pneumatic mechanism disclosed in Letters Patent of the United States No. 1,927,201, granted September 19, 1933, to Herbert L. Bone, for Railway Braking Apparatus. In this retarder the braking bars are moved by a plurality of independently operated units each of which has a fluid pressure motor comprising a cylinder provided with a piston connected to the braking bars by a suitable linkage. The linkage and braking bars are spring biased to a nonbraking or open position and movable to a braking or closed position by pressure admitted to the cylinder. Pressure to the cylinder of each unit is supplied to and exhausted from the cylinder by a control valve governed by two magnet valves.

In the drawings of the present application only the portion of this car retarder mechanism sufficient for a full understanding of our invention is shown for the sake of simplicity, reference being made to the aforementioned H. L. Bone Patent No. 1,927,201 for a complete showing of a car retarder mechanism of the type here contemplated. In Fig. 1b, a cylinder 10 is that of one of the independent operating units of the car retarder, each operating unit of the retarder having a similar cylinder. The cylinder 10 contains a piston 11 attached to a piston rod 12, the outer end of which is adaptable of being connected to the braking bars by a suitable linkage not shown. When the piston 11 occupies its upper position as viewed in the drawings, the braking bars are biased to their nonbraking position. When fluid pressure is admitted to the cylinder 10 above the piston 11, the piston is forced downward and the braking bars are moved to their braking or closed position, the braking force exerted by the bars being determined by the pressure of the actuating fluid which is ordinarily compressed air with a normal pressure of the order of 100 pounds per square inch. The supply of fluid pressure to the cylinder 10 is controlled by a control valve PV which is governed by two magnet valves X and R.

When no car is passing through the retarder CR, the retarder is operated to its open or release position. This normal condition for the car retarder is effected by the magnet X being energized and the magnet R being deenergized.

In the aforesaid Agnew application, the car retarder was normally held closed by full pressure of the source. The car retarder CR of the present application will be closed or in its operating position when the magnet R is energized and the magnet X deenergized.

When the magnet R is energized, a valve 13 actuated thereby is forced downward to close the valve. Also, a valve 14 is forced downward to an open position. With valve 14 open, pressure from the source is admitted through a port 8 to the chamber above a piston 15 of the pneumatic control valve PV forcing the piston 15 downward against the force of a spring 22 to open a control valve 21. With control valve 21 open, pressure is admitted from the source to pipe 24 leading to cylinder 10 with the result the full pressure of the source is applied to the cylinders of the retarder operating units. Also, with magnet X deenergized, a valve 18 is moved upward to an open position and a valve 19 to a closed position. With valve 18 open, the chamber above a piston 20 of the control valve PV is exhausted to atmosphere and a valve 16 is closed by a bias spring 23 and the exhaust port of the pipe 24 is blanked.

When the magnet X is energized and the magnet R is deenergized, the car retarder is operated to its open or release position. With magnet X energized, the valves 18 and 19 are forced downward to close the valve 18 and open the valve 19. Under this condition pressure from the source is admitted through port 8 to the chamber above piston 20 and the control valve 16 is open to exhaust the cylinder 10 to atmosphere. With magnet R deenergized, its valve 13 is open and its valve 14 seated so that the chamber above piston 15 is exhausted with the result the control valve 21 is closed and the supply of pressure from the source to cylinder 10 is shut off.

The magnets R and X are controlled in part by pressure responsive devices 1P, 2P and 3P, each of which comprises a Bourdon tube connected by a pipe 9 to the pipe 24 by which pressure is supplied to cylinder 10. Each Bourdon tube actuates a contact member between a first and a second position. For example, the tube 1P actuates a contact member 25 between a first position where it engages a stationary contact 26 and a second position where it engages a stationary contact 27. Similarly, the tube 2P actuates a contact member 28 between a first position where it engages a contact 29 and a second position where it engages a contact 30, and the tube 3P actuates a contact member 31 between a first position where it engages a contact 32 and a second position where it engages a contact 33.

These pressure regulating tubes are so constructed and adjusted that they operate successively as the pressure in the cylinder 10 increases. For example, for all pressures below 25 pounds per square inch the first position contact of each of the pressure tubes is closed. If the pressure exceeds 25 pounds per square inch, the contact 25—26 of the tube 1P opens and if the pressure exceeds 35 pounds per square inch, the contact 25—27 of the tube 1P is closed. Similarly, the first position contact 28—29 of the tube 2P opens when the pressure exceeds 50 pounds per square inch and the second position contact 28—30 of the tube 2P is closed when the pressure exceeds 60 pounds per square inch. Also, the first position contact 31—32 of the tube 3P opens when the pressure exceeds 75 pounds and the second position contact 31—33 is closed when the pressure exceeds 85 pounds.

It is to be seen that when positive energy is applied to a terminal XP of the car retarder, the magnet X is energized and the magnet R is deenergized and the car retarder is actuated to the nonbraking position. When positive energy is removed from the terminal XP and applied to a terminal 1PP, the magnet X is deenergized and magnet R is energized through contact 25—26 of tube 1P and 100 pound pressure is admitted to the cylinder 10 of the car retarder operating unit. When the pressure builds up to and exceeds 25 pounds per square inch, the contact 25—26 of tube 1P opens and the magnet R is deenergized, with this pressure of 25 pounds retained in the cylinder 10. If the pressure in the cylinder 10 exceeds 35 pounds, then the contact 25—27 of tube 1P is closed so that the magnet X is energized by the positive energy on terminal 1PP through a half-wave rectifier element RE and the control valve PV is actuated to exhaust the pressure in the cylinder 10 until it is reduced to substantially 25 pounds when the contact 25—27 again opens and magnet X is deenergized. On the other hand, if the pressure in the cylinder 10 falls below 25 pounds, then the contact 25—26 is reclosed to energize the magnet R and thereby open the valve 21 of the control valve PV and reapply pressure to the cylinder 10 to build up the pressure.

In a similar manner, when energy is applied to the terminal 2PP of the car retarder control, the magnet R is energized through contact 28—29 of the tube 2P and magnet X is energized through the contact 28—30 of the tube 2P and the rectifier element RE and thereby the pressure in the cylinder 10 is maintained between the pressures of 50 and 60 pounds per square inch. Likewise, when positive energy is applied to the terminal 3PP, the magnets R and X are controlled through contacts 31—32 and 31—33 of the tube 3P to control the pressure in the cylinder 10 between 75 and 85 pounds. Furthermore, when positive energy is applied to terminal 4PP, then the magnet R is energized directly and the full 100 pound pressure of the supply source is applied to the cylinder 10 of the car retarder operating unit. It follows from the foregoing that there are five different control conditions that can be set up for the retarder.

To determine the speed of a car through the retarder CR, track rails 1a and 1b within the car retarder CR are formed with a series of short insulated sections 1S to 11S, inclusive, the rail 1b being formed into sections by the usual insulated rail joints and the rail 1a being electrically continuous and common to all of the track sections. These sections are preferably of the same length and extend substantially from the entrance end of the car retarder to the leaving end thereof. In a preferred arrangement each track section is 3 feet 1½ inches in length, this length being selected because it agrees with the structure of the car retarder here contemplated and it also assures that for all ordinary spacing of the successive pairs of wheels of railway cars no two pairs of wheels can occupy a single section simultaneously. Furthermore, the eleven sections provide a total length that is suitable for a common arrangement of car retarder.

Each of these track sections is provided with a normally closed track circuit which includes a direct current track relay T plus a numeral corresponding to the section and a direct current source, such as a track battery. Preferably, all the track circuits except that for leaving section 11S are supplied from a single source of direct current, here shown as a track battery TB1. The leaving section 11S is provided with an individual track battery TB2.

Each track circuit includes, except for the last section 11S, a holding or stick circuit, a shunting circuit and a reset or pickup circuit. These circuits are similar for each track circuit. For example, the track relay 1T for the track circuit of section 1S is normally energized by a holding circuit that extends in series from the positive terminal of the track battery TB1, through front contacts 35 to 44, inclusive, of the track relays 10T to 1T, inclusive, winding of the relay 1T and an individual current limiting resistor R1 and wire 45 to the negative terminal of the battery TB1. Similarly, the individual holding circuit for each of the track relays 2T to 10T branches off this original holding circuit at the front contact of the relay and extends through the winding of the relay and thence through an individual current limiting resistor of the series of resistors R2 to R10, inclusive, and wire 45 to the negative terminal of the battery. Thus, each track relay 1T to 10T is normally energized through its own front contact and a front contact of all the following track relays of the series in sequence.

The shunting circuit for each track circuit of sections 1S to 10S includes a connection from the positive terminal of the battery TB1 to the common rail 1a through two branch paths, the first one of which includes contacts of certain control relays to be referred to hereinafter. For example, the first branch of a shunting circuit of the track relay 1T extends from battery TB1 through wire 46, reverse contacts 47 and 48 of relays 1SU and 2SU, respectively, back contact 49 of a relay ER, wire 50 and to common rail 1a. The shunting circuit for relay 1T is completed from rail 1a through a pair of car wheels and axle to rail 1b of section 1S and wire 51 to the junction terminal of the winding of relay 1T and resistor R1. Similarly, the first branch of the shunting circuit for each of the track relays 2T to 10T is completed to the rail 1a as previously described and then the shunting circuit extends through a pair of car wheels and axle to the rail 1b of the respective track section and to the junction terminal of the relay winding and the individual resistor. The second branch of the shunting circuit for the relay winding 1T extends from the positive terminal of battery TB1 through wire 46, back contact 52 of a relay NR, wire 53, back contacts 54 to 63, inclusive, in multiple of relays 1T to 10T, respectively, and wires 64 and 50 to the common rail 1a and thence by a car shunt to the insulated rail 1b. The parts are proportioned for each track relay 1T to 10T to be normally supplied with a suitable working value of current, the current for each relay being adjustable by the individual resistor interposed in the holding circuit. Also, the parts are so proportioned that a suitable shunting sensitivity for each track relay is obtained.

The reset or pickup circuit for the track circuits is arranged so as to pick up the relays 1T to 10T in cascade, beginning with the relay 1T. The reset circuit for the relay 1T, for example, extends from positive terminal of battery TB1 through wire 46, front contact 65 of relay NR, wire 66, winding of relay 1T, resistor R1 and wire 45 to the negative terminal of the battery. Branching from this original reset circuit, the reset circuit for the relay 2T extends over front contact 44 of relay 1T, winding of relay 2T and resistor R2 and wire 45 to the negative terminal of the battery. The reset circuit for each of the other track relays branches off the original reset circuit through a front contact of each track relay to the rear as will be apparent from an inspection of the drawings. It is clear, therefore, that this cascade pickup arrangement for the track relays assure that no relay in the group can pick up until all relays in the rear of it are picked up.

The track circuit for the last or leaving section 11S is a normally closed circuit similar to those provided for the other sections except it is provided with its own track battery TB2 and is responsive to occupancy of the section 11S only. The track relay 11T of section 11S is normally energized by a holding circuit that includes battery TB2, a resistor R12, winding of relay 11T and a resistor R11, the resistor R12 being normally by-passed by a front contact 34 of track relay 10T. A shunting circuit for the relay 11T extends from positive terminal of battery TB2 over wires 64 and 50 to the track rail 1a and thence through the shunt formed by a pair of car wheels to rail 1b of section 11S and to the junction terminal of the resistor R11 and the relay winding. It is clear that the track relay 11T is provided with operating characteristics similar to those provided for the other track relays except it is controlled only by occupancy of the section 11S. The resistor R12 and the by-pass path through the front contact 34 of track relay 10T assures that the leakage resistance for the track section 11S at which the track relay 11T fails is substantially the same for both the picking up of the relay 11T and the release of the relay.

These track relays are used to control a time measuring means by which the speed at which a pair of car wheels moves through an individual track section is determined by measuring the time consumed by the pair of car wheels moving through the section. This time measuring means may take different forms and its specific structure forms no part of our invention, there being several such time measuring means known to the art. As here shown, this time measuring means is an alternating current cycle counting device and comprises a source of alternating current of a selected frequency, an alternating current cycle repeater CP, a unit cycle counter UC and a multiple cycle counter MC. Preferably this time measuring means is similar to that disclosed and described in Letters Patent of the United States No. 2,320,802, granted June 1, 1943, to Clarence S. Snavely, for Railway Braking Apparatus, and reference is made to that patent for a complete description of such time measuring means. It is described herein only to the extent necessary for a full understanding of our invention.

The alternating current source may be the usual 60 cycle commercial supply, the terminals of which source are indicated by the reference characters BX and NX. It is to be understood, of course, that alternating current of other frequencies can be used.

The alternating current cycle repeater CP includes quick acting relays and rectifiers, the relays being operable to alternately close contacts in step with the cycles of the alternating current. That is, each contact of a pair of contacts is closed 1/60 of a second or 16⅔ milliseconds and is then open for a like period.

The unit cycle counter UC includes a chain of six quick acting relays, the relay 4U of the chain being the only one shown. This relay chain is connected to the cycle repeater by wires 67 and 68 and the relays are interconnected in such a manner that the chain serves to count the operations of the cycle repeater. The action of this chain is advanced by one relay each cycle of the alternating current and thus the particular relay that is operated at any given time gives a direct measure of the lapsed time from the beginning of the operation. Circuit connections are provided so that, when the count of six is exceeded, the chain doubles back and continues to count over and over again. The complete operation is here considered as seven operations of the chain UC. Thus each operation of the unit chain UC represents a time period of .1 second or 100 milliseconds, and the seven complete operations represent a total time period of .7 second.

The multiple cycle counter MC includes a chain of six counting relays of which only the final relay 6M is shown in the drawings. This multiple counting chain is connected to the unit cycle counter UC in such a manner as to progressively pick up the relays one each time the unit chain completes a round trip operation. Thus the six relays of the multiple chain are all picked up in response to six operations of the chain UC and measure the time interval of .6 second or 600 milliseconds. It is obvious that the particular relays of the unit chain UC and the multiple chain MC which are picked up at any time are a measure of the time that any track section which is then functioning as a measuring section has been occupied within the limit of the time measuring means. For example, if the relays 6M and 6U are picked up while a pair of car wheels is moving through the 3 feet 1½ inches of a track section, the average speed of the car is approximately 3.1 miles per hour.

Correspondingly, if the unit chain makes only one operation and the relay 1M of the multiple chain is picked up while the car is moving through the track section and consumes only .1 second, the average speed of the car is approximately 21.3 miles per hour. It is to be seen, therefore, that this time measuring means is capable of measuring a range of speeds from 3 miles per hour to 20 miles per hour.

This time measuring means is controlled by the track relays of the track circuits through the two biased polar relays 1SU and 2SU, these relays being biased to a reverse position, that is, the right-hand position as viewed in the drawings, and operated to a normal or left-hand position when the relay is energized by direct current of the proper polarity from a source, the positive and negative terminals of which are indicated by the reference characters B and N. These relays 1SU and 2SU are operated alternately as the consecutive track sections 1S to 11S are occupied and the corresponding track relays are released one at a time as a car moves through this stretch. These relays 1SU and 2SU provide a direct control of the cycle repeater CP and function to provide a starting, operating and holding circuit for the relay chains of the units UC and MC. The relays are also cross connected to prevent any overlapping in their operation. For purposes hereinafter appearing, the respective operating windings of the relays 1SU and 2SU each series-connected through a different operating winding of a biased relay 1UT to the track relay contacts.

Specifically, when the leading pair of wheels of a car enters the section 1S and shunts the track relay 1T, a starting circuit is completed from terminal B through front contacts 69 to 78, inclusive, of the track relays 11T to 2T, respectively, back contact 79 of the track relay 1T, wire 80, a winding of the relay 1UT, through the windings of the relay 1SU, reverse contact 81 of the relay 2SU, reverse contacts 82 and 83 of control relays 1SPR and 2SPR, respectively, to be referred to later, and wire 84 to negative terminal N through contacts of the relays of the multiple cycle counter MC and the unit cycle counter UC in the manner shown in the aforementioned C. S. Snavely Patent No. 2,320,802. This starting circuit thus energizes the relays 1SU and 1UT and the relays are operated to their normal or left-hand position. The contact 85 of the relay 1SU is closed to complete a circuit by which alternating current is supplied to the cycle repeater CP. The repeater CP is set into operation to in turn supply current impulses to the counting chains UC and MC and operate the relays of the chains in the manner previously described. With the relay 1SU operated to the left-hand position closing its contact 86, an operating and holding circuit is completed for the units UC and MC, the operating circuit branching off from the previously described starting circuit and being completed through contact 86 of relay 1SU and wire 87, and the holding circuit branching off from the operating circuit through a resistor 88. With the relay 1SU thus operated, the time measuring means functions to determine the time consumed for the leading pair of wheels of the car in passing through the section 1S. The control set up by the time measuring means in response to this time period will be referred to hereinafter.

When the leading pair of car wheels enters the section 2S and shunts the track relay 2T, the opening of front contact 78 deenergizes the control relay 1SU and it is immediately restored to its reverse position and thereby opens the circuit by which energy is supplied to the cycle repeater and to the counting chains and they are reset. The closing of back contact 78 of track relay 2T completes a new starting circuit which includes relay 2SU and relay 1UT, and which circuit can be traced from terminal B through front contacts 69 to 77 of the track relays 11T to 3T, respectively, back contact 78 of relay 2T, wire 89, the other winding of relay 1UT, the windings of relay 2SU, reverse contact 90 of relay 1SU and thence to the cycle counting units MC and UC as pointed out for the previous starting circuit. This causes relay 2SU to be operated to its normal or left-hand position and holds the relay 1UT energized for the purposes hereinafter appearing. Relay 2SU closes its contact 91 and again causes alternating current to be supplied to the cycle repeater CP and current impulses in turn to be applied to the counting chains. With the control relay 2SU operating to its normal position closing contact 92, the previously traced operating and holding circuits for the counting chain units are again completed. Thus the cycle counter units UC and MC are operated to measure the time consumed by the pair of car wheels in passing through the section 2S and thereby determine the speed of the car in this track section.

When the leading pair of car wheels enters the section 3S and shunts the track relay 3T to open front contact 77, current is removed from the relay 2SU and the relay 2SU and the relays of the counting chains of the time measuring means are at once reset. The closing of back contact 77 of the track relay 3T completes the first starting circuit for the relay 1SU and that relay is operated to its normal position to again start operation of the time measuring means. It is to be seen that a new operation of the time measuring means is initiated each time the leading pair of car wheels enters a succeeding track section and thereby measures the car speed in each track section. It will also be noted that relay 1UT will remain energized so long as a pair of car wheels is within the car retarder CR.

The apparatus includes a normal reset relay NR and an emergency reset relay ER by which the track relays are reset when the leading pair of car wheels leaves the last section 11S and control of the time measuring means is passed to the next pair of car wheels in the rear and so on to the successive pairs of car wheels until the entire car has completely passed out of the track sections. The normal reset relay NR is provided with a pickup and a stick circuit, the pickup circuit having two alternate paths. The first path extends from terminal B over back contact 94 of the track relay 11T, wire 95 and winding of the relay to terminal N of the current source. The second path of the pickup circuit extends from terminal B over front contact 96 of relay 6M of the counting chain MC, front contact 97 of relay ER and winding of relay NR to terminal N. The stick circuit for relay NR includes its own front contact 98 and front contact 99 of the emergency reset relay ER. The emergency reset relay ER is provided with a pickup circuit which extends from terminal B, through front contact 100 of the relay 6M of the counting chain MC, front contact 101 of relay 4U of the counting chain UC, and winding of the relay ER to terminal N. A stick circuit is also provided for the relay ER and this circuit includes front contact 102 of the relay ER and front contact 100 of relay 6M. Preferably, the pickup and release time of the emergency relay ER is governed by a network of resistors and capacitors connected across the relay winding as will be apparent by an inspection of the drawings.

It follows that when the relay 1SU is operated in response to the leading pair of car wheels entering the final section 11S and starting operation of the time measuring means, the reset relay NR is picked up due to the closing of back contact 94 of track relay 11T. With relay NR picked up closing front contact 65, the previously described pickup circuit for the track relays 1T to 10T is completed. Also, the opening of back contact 52 of relay NR opens the second branch path of the shunting circuit for the track circuits of the sections 1S to 10S, and since the first branch path of the shunting circuit is now open at reverse contact 47 of the relay 1SU, the track relays 1T to 10T are picked up whether or not any car wheels occupy the sections 10S to 1S. Then, when the leading pair of car wheels leaves the section 11S and the control relay 1SU is reset closing its contact 47, the shunting circuit path for the track circuits is completed and the track relay of any section occupied by a following pair of wheels is shunted and all the track relays to the rear of the shunted track relay are released. It is to be seen, therefore, that the control of the track relays is passed from the leading pair of wheels to the next pair of wheels in the rear as the leading pair of wheels leaves the section 11S and this action is repeated for the succeeding pairs of wheels of the car due to the operation of the reset relay NR.

To sum up, therefore, when no car is traversing this series of track sections each of the track relays is retained picked up due to its holding circuit. When a car traverses the sections the leading pair of wheels as it enters each track section shunts the corresponding track relay and that relay is released and all relays to the rear are retained released. When the leading pair of wheels leaves the section 10S and enters the last section 11S, the track relays to the rear are reset due to the reset relay NR being picked up to close its front contact 65 and due to the shunting circuit being open at back contact 52 of relay NR and reverse contact 47 of relay 1SU. The track relays are picked up in sequence and each is picked up only if the relays in the rear are picked up. Each pair of wheels of a car has the same control as the leading pair of wheels and the track relays are responsive to the car shunt until the car has passed completely out of the track sections. Furthermore, each track relay is provided with a suitable working current to assure it is retained energized under relatively low leakage resistance between the sections which may be caused by metal chips from the braking bars of the car retarder and from the car wheels when they are being braked, such metal chips tending to bridge the insulated joints. Also, a shunting sensitivity for each track relay is obtained such that each track relay is responsive to a relative high resistance car shunt obtained from a single pair of car wheels.

When a pair of wheels passes off the leaving section 11S and the next pair of wheels to the rear takes over control of the speed measuring means, this pair of wheels is very likely to be part way through the track section it then occupies, with the result the measured speed will be too high due to the shortened length of travel of the controlling pair of wheels. To prevent this false measurement of the speed, the apparatus includes a pair of even and odd cancellation relays EC and OC, respectively, the purpose of which is to cancel the first speed measurement after occupancy of the leaving track circuit. These cancellation relays also function to hold the retarder at its nonbraking or open position for stalled or very slow moving cars. Each of these cancellation relays is controlled through a pickup circuit and a stick circuit. The pickup circuit for the even cancellation relay EC extends from positive terminal B of the power source through front contact 103 of track relay 10T, wire 104, normal contacts 105 and 106 in multiple of the control relays 1SPR and 2SPR, respectively, front contact 107 of reset relay NR and winding of relay EC to terminal N. The stick circuit for this relay EC includes terminal B, back contacts 108, 109, 110, 111 and 112 of the even-numbered track relays 10T, 8T, 6T, 4T and 2T, respectively, and a front contact of each of the track relays in advance of the released track relay in sequence, wire 113, front contact 114 and winding of the relay EC, and terminal N. Similarly, the pickup circuit of the odd cancellation relay OC is the same as that traced for the relay EC except that it includes front contact 115 of the relay NR. The stick circuit for the odd cancellation relay OC includes terminal B, back contacts 116, 117, 118, 119, 120 and 121 of the odd-numbered track relays 11T, 9T, 7T, 5T, 3T and 1T, respectively, and a front contact for each track relay in advance of the odd-numbered relay released, wire 122, front contact 123 and winding of the relay OC and terminal N. The specific manner in which these cancellation relays function will be described when the operation of the apparatus is described.

It has been explained hereinbefore that the car retarder CR is provided with four different pressure conditions which are selectively established according to which of the control terminals of the pressure regulating tubes positive energy is applied. Consequently, the time measuring means is connected to the car retarder pressure regulating control terminals through a speed pressure selective means for automatic control of the retarder, the automatic control being such that the car speed is decreased or allowed to increase as required in order for the car unit to leave the retarder at the desired leaving speed. To this end there is provided a speed pressure selective means including a series of leaving speed selectors and a speed pressure selective circuit network together with a group of control relays.

This speed pressure selective means is the subject of the above-mentioned Agnew Patent No. 2,727,138. This speed pressure selective means is not here claimed and it will be disclosed and described only as needed for a full understanding of the automatic control of the retarder by the speed determining and control apparatus. Reference is made to the Agnew patent for a full description of the speed pressure selective means.

There are provided six leaving speed selectors here shown as six push buttons 1PB to 6PB, inclusive. These push buttons are mounted for convenient operation by the operator in charge of the retarder CR. These push buttons are alike and each is operable to a normal and a reverse position and provided with a normal and a reverse position contact. Each push button is assigned a leaving speed, such as, for example, 4, 5, 6, 7, 8 and 9 miles per hour for the push buttons 1PB, 2PB, 3PB, 4PB, 5PB and 6PB, respectively. This series of push buttons is provided with a series of repeater relays, one for each push button, the relays 1PR to 6PR being assigned to the push buttons 1PB to 6PB, respectively.

The circuit arrangement is such that each relay is energized in response to operation of the corresponding push button. For example, the relay 1PR is energized by a simple circuit including the reverse position contact of the push button 1PB. Likewise, the circuit for each of the other relays includes the reverse position contact of the corresponding push button and the normal position contact of all the push buttons ahead as will be apparent by an inspection of Fig. 1a. Furthermore, the first relay 1PR is normally energized through a circuit including in series the normal contacts of all the push buttons and thus the lowest leaving speed of 4 miles per hour is normally selected. These repeater relays are used to set up controls in the speed pressure selective circuit network here indicated conventionally by a rectangle SP.

Since it is desirable to have the initial pressure of the retarder and the partial pressure to which the initial pressure is reduced as the car approaches the requested leaving speed vary with the requested leaving speed, a group of car retarder control relays 1PPR, 1SPR, 2PPR and 2SPR are jointly controlled by the speed measuring apparatus and the repeater relays 1PR to 6PR through a network set up within the speed pressure selective network SP. Power for energizing the relays 1PPR and 1SPR in series is applied at times to a terminal 150 of the network SP and thence is applied to the relays 1PPR and 1SPR in series through a current limiting resistor 155. Similarly, the two relays 2PPR and 2SPR in series are energized through a current limiting resistor 93 by current supplied to a terminal 151 of the network SP. For reasons to appear shortly, the control relays 1PPR and 1SPR are at times provided with energizing current through a stick circuit that is controlled by the cancellation relays EC and OC, the circuit including front contacts 124 and 125 in multiple of the cancellation relays EC and OC, respectively, reverse contact 128 of relay 2SPR, normal contact 129 of relay 1SPR, normal contact 130 of relay 1PPR, terminal 152 of the network SP and thence through the network by connection indicated conventionally by a dotted line 148 to the terminal 150 and then as previously traced through the windings of these two relays in series. Similarly, the two relays 2PPR and 2SPR are provided with a stick circuit by which they are at times energized, and which stick circuit also includes front contacts 124 and 125 of the cancellation relays EC and OC, normal contact 126 of relay 2SPR, normal contact 127 of relay 2PPR, terminal 153 of the network SP and through the network by a circuit connection indicated conventionally by dotted line 154 to terminal 151 and thence through the windings of the two relays in series. As explained in the aforementioned Agnew patent, the two relays 1PPR and 1SPR are retained in their biased reverse position until the car speed approaches a selected partial pressure release speed which is a little above the desired leaving speed and at which partial pressure release speed it is desirable to reduce the initial pressure applied to the retarder to a selected partial pressure, these relays then being operated to their normal or left-hand position. Also, the two relays 2PPR and 2SPR are retained at their biased reverse position until the car speed is reduced to a full release speed which is substantially the selected leaving speed and the relays are then operated to their normal position. This group of control relays govern the supply of positive energy to the terminals XP to 4PP of the retarder control through circuit connections within the speed pressure circuit network SP as determined by the operation of the push buttons and by the setting of the speed measuring means in response to the speed of a car moving through the various track sections. Specifically, energy from positive terminal B of the power source is applied over the front contact 159 of relay A which will presently be described, wire 160 and through reverse contacts 131 and 132 of the relays 2PPR and 1PPR, respectively, to a terminal 133 within the circuit network SP. This terminal 133 is in turn connected through different selective circuits of the network to any one of the terminals 134 to 137, these selective circuits being indicated by dotted lines and would be in accordance with the selection provided in the Agnew patent. The terminals 134, 135, 136 and 137 are in turn connected to the retarder terminals 1PP, 2PP, 3PP and 4PP, respectively, by wires 143, 144, 145, and 146, respectively. Again, positive energy is applied from terminal B of the power source over front contact 159 of relay A, through reverse contact 131 of relay 2PPR and normal contact 132 of relay 1PPR to a terminal 141 within the circuit network SP, and which terminal 141 is connected to the terminals 134 to 137 by selective circuits within the network SP as indicated by dotted lines. Furthermore, positive energy is at times supplied from terminal B over the front contact 159 of relay A and through normal contact 140 of relay 2PPR to a terminal 139 in the network SP, and which terminal 139 is in turn connected to terminal 138 by a selective circuit, the terminal 138 being in turn connected to terminal XP of the retarder control by wire 147.

As more fully set forth in application for Letters Patent of the United States, Serial No. 283,931, filed on April 23, 1952, by David P. Fitzsimmons, for Railway Car Speed Determining and Control Apparatus, now Patent No. 2,751,492, issued June 19, 1956, the desired leaving speed for a car unit approaching the car retarder CR is selected by the operation of one of the push buttons 1PB to 6PB and the setting of the speed pressure selective means SP. The operation of the selected push button and the operation of the control relays 1PPR, 2PPR, 1SPR and 2SPR applies the required positive voltages to the car retarder terminals XP, 1PP, 2PP, 3PP and 4PP to energize or deenergize the valve magnets R and X to control the pressure applied by the car retarder to the wheels of a car unit within the retarder. In the aforesaid Fitzsimmons patent, the car retarder brake beams are normally operated to their braking or closed position with no car in the retarder, positive voltage being applied to the retarder terminal 4PP to hold the magnet R energized and the magnet X deenergized.

In certain car retarder installations where a great number of slow rolling cars are moved through the yard, a car retarder normally operated to its closed or braking position when no car is in the retarder is operated unnecessarily between the cuts of cars. In such installations, when a car unit within the retarder reaches the desired leaving speed, the retarder will open, venting the pressure within the cylinders. After the car unit leaves the retarder and before the next car unit enters the retarder, the car retarder is reset or closed by the fluid pressure supplied from the pressure lines or compressor. Should the succeeding car unit be traveling at a speed below the desired leaving speed, the car retarder cylinders will again be vented to atmosphere.

To save the unnecessary operations of a car retarder where a great number of the cars passing through the retarder are moving at speeds less than the desired leaving speed, we have provided a novel by-pass control circuit for maintaining the car retarder normally open when no car is within the car retarder. To this end, we have provided an occupancy relay RR1 controlled over the normal contact 161 of the relay 1UT, the circuit for the relay RR1 extending from the positive terminal B over the normal contact 161 of relay 1UT, wire 162, and winding of relay RR1 to the negative terminal N. A holding circuit is also provided for the occupancy relay RR1 through the multiple-connected front contacts 124 and 125 of the cancellation relays EC and OC, respectively. As previously indicated, the relay 1UT will be energized and remain energized by the operation of the track relays 1T to 11T so long as a car unit remains within the car retarder CR. The normal contact 161 of relay 1UT is thus closed to hold the occupancy relay RR1 energized so long as a car unit remains within the retarder.

A by-pass relay A is also provided in the car retarder control circuits for maintaining the car retarder open, the relay A being controlled over a back contact 163 of track relay 2T. The energizing circuit for the relay A extends from the positive terminal B through back contact 163 of relay 2T, wire 164, and the winding of relay A to the negative terminal N. A stick circuit is also provided for the relay A over its own front contact 165, wire 166 and front contact 167 of relay RR1. A back contact 168 of relay A connects the positive terminal B of the power source through wires 169 and 147 to terminal XP of the car retarder. Thus positive energy is applied at all times to terminal XP of the car retarder, when no car is within the retarder, to hold the magnet X energized and magnet R deenergized. As previously described with the magnet X energized, valve 16 is open to vent the brake cylinders to atmosphere, the valve 21 being closed due to the deenergization of magnet R. The car retarder CR is thus in its open position when there is no car unit within the retarder.

Assuming now that a car unit enters the car retarder CR, the track relay 1T will be shunted to set in operation the timing chain relays in the manner heretofore indicated. The relay 1UT will also be energized over the circuits previously traced and closes contact 161 to energize relay RR1. The control relays 1PPR, 2PPR, 1SPR and 2SPR will be operated in the manner indicated, but positive energy will not be applied to the car retarder terminals 1PP to 4PP due to the open front contact 159 of relay A. As the leading car wheels of the car unit enter the second section 2S of the car retarder, track relay 2T will be shunted to close its back contact 163. Relay A is thus energized to complete the stick circuit over its front contact 165 and to open its back contact 168, thereby removing the positive energy from terminal XP. Relay A also closes its front contact 159 to connect the positive terminal B of the power supply to the reverse contact 131 and normal contact 140 of the control relay 2PPR. Thus the control of the car retarder is now taken over by the control relays, the car retarder operating in its usual manner to brake the car wheels.

Specifically, we shall assume that a leaving speed of 5 miles per hour is selected by operation of the push button 2PB to establish a desired leaving speed for a car unit approaching the car retarder CR, and the circuit network SP is set to apply 100 pounds' initial pressure to the car retarder, and a partial pressure of 50 pounds per square inch and a partial pressure release speed of 5.5 miles per hour. This selection would provide energy to terminal 137 of the network SP and in turn to terminal 4PP of the retarder control if the front contact 159 of relay A were closed. When the leading pair of wheels of this car unit enters the section 1S to shunt track relay 1T, the speed measuring means is operated to measure the car speed in this section, as hereinbefore explained. Assuming that the speed of the car unit is well above 5.5 miles per hour no change is made in the control circuits of the retarder, the retarder remaining open due to the energization of magnet X. When the leading pair of car wheels enters the section 2S and shunts the track relay 2T, the speed measuring means is reset and a new measure of the speed is made while the leading pair of wheels is moving through the section 2S. Relay A is now energized to close its front contact 159 to supply energy to the contacts of relay 2PPR. Assuming that the car speed is still above 5.5 miles per hour, positive energy is applied to terminal 4PP to cause a pressure of 100 pounds to be applied to the cylinders of the car retarder. A braking force derived from the 100 pounds' pressure is exerted by the retarder. When the car wheels roll into section 3S of the retarder, the relays A, RR1 and 1UT remain energized, the front contact 159 of relay A remaining closed and the back contact 168 remaining open.

Assuming next that the car speed is reduced to approximately 5.5 miles per hour in the section 6S, the speed measuring means indicates this partial pressure release speed of 5.5 miles per hour for section 6S and the network is controlled in such a manner that energy is applied to the relays 1PPR and 1SPR and these relays are energized so that the normal contact 132 of the relay 1PPR is closed and energy is applied to terminal 141 of the network SP. The network SP is now so completed as to apply energy from the terminal 141 to terminal 135 and energy is in turn applied to terminal 2PP of the car retarder control and the retarder is controlled through the tube 2P and the pressure applied to the cylinders of the car retarder is reduced to the selected partial pressure of 50 pounds per square inch.

We shall now assume that this braking force is sufficient to reduce the speed of this car unit to the selected leaving speed of 5 miles per hour in section 10S. When the speed measuring means indicates a speed of 5 miles per hour in section 10S, the network SP is so controlled as to cause relays 2PPR and 2SPR to be operated closing the normal contact 140 of the relay 2PPR. This causes positive energy to be applied to terminal 139 of the network, and which terminal at this time is connected to terminal 138 and hence to the terminal XP of the retarder control, with the result the retarder is released and the car moves forward without any braking force on the part of the car retarder. When the leading pair of wheels of the car unit leaves the section 11S, the time measuring means is reset and also the track relays are reset as previously explained.

On the assumption that the next pair of car wheels in the rear occupies the section 9S as the leading pair of wheels leaves the section 11S, the track relay 9T and all the track relays to the rear are released due to the shunting of the section 9S. Since, at the time the reset relay NR is picked up to close front contact 115, the pickup circuit for the odd cancellation relay OC is completed because track relay 10T is now picked up to close its front contact 103 and relay 2SPR is operated to its normal position closing normal contact 106. Then, with relay OC once picked up it is retained energized by its stick circuit completed through back contact 117 of the now shunted track relay 9T. With the cancellation relay OC picked up closing front contact 125, energy is applied over the stick circuit to the relays 2PPR and 2SPR and these relays are retained in their normal position with the result the car retarder is held open notwithstanding any selection made by the time measuring means which would tend to release the relays 2PPR and 2SPR. That is to say, no change in the position of the control relays 2PPR and 2SPR can be effected through the time measuring means due to this pair of car wheels shunting the track relay 9T and the time measuring means operated only during the portion of the travel of the pair of wheels in the section 9S. With the cancellation relay OC picked up, the closing of the front contact 125 also holds the occupancy relay RR1 energized and consequently relay A is also held energized during this transitional period.

When this second pair of car wheels enters the section 10S and shunts track relay 10T, opening front contact 149 of that relay, the stick circuit for the cancellation relay OC is open and the relay OC is released so that the control of the relays 2PPR and 2SPR effected by the stick circuit through front contact 125 of relay OC is cancelled and the time measuring means again controls these relays according to the speed determined for the car moving through the sections 10S and 11S.

In the event this second pair of car wheels occupies the section 8S, then the cancellation relay EC would be held energized and completes at its front contact 124 the stick circuit for the relays 2PPR and 2SPR and thereby cancels any control effected by the time measuring means during the period this second pair of wheels passes through a portion of the section 8S. The holding circuit previously described for the occupancy relay RR1 is also completed over the front contact 124 of relay EC so that relay A is maintained energized. It is clear that when this second pair of car wheels leaves the section 11S the control of the time measuring means and in turn, of the car retarder, is passed to the next pair of wheels in the rear and this control repeated for each successive pair of wheels until the last pair of wheels of the car unit leaves the section 11S.

It is to be noted that this cancellation action effected through the relays OC and EC is carried out only if the leaving section 11S is first occupied and the reset relay NR picked up closing its front contact 115. Also, that the two relays EC and OC determine which track sections in the rear are occupied and if the nearest occupied section to the leaving section is an odd or an even section. When the next section in advance is entered by this pair of wheels to shunt the track relay, the control of the cancellation relays is removed and the control of the speed measuring means restored.

If for any reason the car unit is traveling very slowly or is stalled in the retarder, the retarder is opened so that the car unit may pick up speed and leave the retarder at near the correct or selected leaving speed. Assuming the car unit is stopped or moving very slowly with its leading pair of wheels in the section 6S, all the entrance end track relays up to and including relay 6T are released and all the leaving end track relays 7T to 11T are picked up. This permits the time measuring means to operate to its limit so that the relays 6M and 4U are picked up. Also, the control relays 2PPR and 2SPR will be energized through the network because the measured speed is less than the selected leaving speed of 5 miles per hour. The reset relays ER and NR are now energized in sequence and in turn the cancellation relays OC and EC are picked up, the latter relays providing energy for holding the relays 2PPR and 2SPR energized. This causes energy to be applied to terminal 139 of the network and in turn to terminal XP of the retarder and the pressure in the retarder is exhausted and the retarder is operated to its open or non-braking position. Furthermore, the time measuring means is reset causing relay 6M to be released with the result the reset relays ER and NR are deenergized and released. With the retarder released, the car unit will start moving due to gravity. The cancellation relay EC will be retained energized until the leading pair of wheels enters the section 7S and shunts the track relay 7T, the release of relay 7T opening the stick circuit for relay EC so that that relay is now deenergized. This permits the time measuring means to start anew. If the speed of the car is still too low in section 7S, the relay 2PPR is again energized through the selective network and positive energy is applied to the retarder terminal XP so that the retarder is held open. It is to be pointed out that the release period of relay 2PPR is sufficient to bridge the period from the release of the cancellation relay EC to open the stick circuit for the relay 2PPR and the operation of the time measuring means to reestablish the energizing circuit for the relay 2PPR through the selective network SP.

It is apparent from the foregoing discussion that the timing action will be repeated over and over again and the retarder held open so long as the car unit moves slowly but that the retarder will be operated to reapply the braking force if the car unit picks up speed to exceed the selected leaving speed of 5 miles per hour.

Assuming that a car unit enters the car retarder CR at less than the desired leaving speed of 5 miles per hour, shunting of track relay 1T will set in operation the relay counting chains, the time measuring means being permitted to operate to its limit so that the relays 4U and 6M are energized. The control relays 2PPR and 2SPR will be energized through the network since the measured speed of the car unit in section 1S is less than the selected leaving speed. The normal contact 140 of relay 2PPR will be closed to connect wire 160 to the terminal 138 of the network SP. The control circuits are thus conditioned to apply a positive voltage to the car retarder terminal XP should the relay A be energized. When the leading wheels of the slow moving car unit enter section 2S of the car retarder, the energization of relay A merely transfers the positive energy supply to terminal XP from its back contact 168 and wire 169 to its front contact 159 and wire 160 so that the car retarder remains open as the car unit proceeds through the retarder. Should the car unit speed up while in the retarder, the time measuring means set in operation by the particular section in which the speed-up occurred will take over the control of the retarder, the control relays 2PPR and 2SPR being deenergized and restored to their biased reverse position to apply positive energy to the retarder control terminal 2PP so that pressure on the retarder is established and a braking force applied to the car wheels.

In view of the foregoing description of the operation of the apparatus for a leaving speed of 5 miles per hour, it is apparent that the apparatus will operate in substantially the same manner for any other selected leaving speed between 4 and 9 miles per hour and for any selected initial pressure and partial pressure of the retarder selected within the limits of the apparatus.

Although we have herein shown and described but one form of railway car speed determining and control apparatus embodying our invention, it is understood that various changes and modifications may be made therein within the scope of the appended claims without departing from the spirit and scope of our invention.

Having thus described our invention, what we claim is:

1. In a car retarder control system wherein a plurality of insulated track sections are provided for measuring the speed of a car and having a speed measuring device controlled by the leading pair of car wheels rolling over each of the measuring sections to operate a braking means in accordance with the speed of the car to provide a predetermined speed for the car when leaving the retarder, the combination comprising, means for registering by its position the occupancy of any of said sections, by-pass means for registering by its position the occupancy of a preselected one of said sections, means controlled by both said registering means in their registering positions for holding said by-pass means in its registering position when said preselected section becomes unoccupied, means for holding said braking means inoperative when said by-pass means is not in its registering position, and means for effecting operation of said braking means in accordance with the speed of the car when said by-pass means is in its registering position.

2. In a car retarder control system wherein a plurality of insulated track sections are provided for measuring the speed of a car, each of said track sections having a track circuit including a track relay for controlling the operation of a speed measuring device when the leading pair of wheels enters the particular track section, the speed measuring device controlling the operation of a braking means for controlling the speed of the car through the retarder to provide a predetermined speed for the car when leaving the retarder, and wherein reset and cancellation relays controlled by the track relays pass the control of the speed measuring device to the next succeeding pair of car wheels after the leading pair of car wheels leaves the last measuring section only after the succeeding pair of wheels has passed over an entire measuring section, the combination comprising, occupancy means for registering by its position the leading pair of car wheels occupying any measuring section, by-pass means for registering by its position the leading pair of car wheels occupying a preselected one of the measuring sections after a speed measurement has been made in the preceding section, circuit means controlled by the cancellation relays for holding said occupancy means in its registering position after the leading pair of car wheels leaves the last measuring section, means controlled by said occupancy means and said by-pass means in their registering positions for maintaining said by-pass means in its registering position, means for holding said braking means inoperative when said by-pass means is not in its registering position, and means for effecting operation of said braking means in accordance with the speed of the car as measured by said speed measuring device when said by-pass means is in its registering position.

3. In a car retarder control system wherein a plurality of insulated track sections are provided for measuring the speed of a car, each of said track sections having a track circuit including a track relay for controlling the operation of a speed measuring device when the leading pair of wheels enters the particular track section, the speed measuring device controlling the operation of a braking means for controlling the speed of the car through the retarder to provide a predetermined speed for the car when leaving the retarder, and wherein reset and cancallation relays controlled by the track relays pass the control of the speed measuring device to the next succeeding pair of car wheels after the leading pair of car wheels leaves the last measuring section only after the succeeding pair of wheels has passed over an entire measuring section, the combination comprising, an occupancy relay, means for energizing said occupancy relay when any of said sections is occupied, a by-pass relay, means for energizing said by-pass relay when the leading pair of car wheels enters the second of said measuring sections after a speed measurement has been made in a first of said secticns, means for holding said occupancy relay energized when said cancellation relays are energized, means for holding said by-pass relay energized when it has been energized and said occupancy relay is energized, means for holding said braking means inoperative when said by-pass relay is deenergized, and means for effecting operation of the braking means in accordance with the speed measurement of the car by said speed measuring device when said by-pass relay is energized.

4. In a car retarder control system wherein a plurality of insulated track sections are provided for measuring the speed of a car, each of said track sections having a track circuit including a track relay for controlling the operation of a speed measuring device when the leading pair of wheels enters the particular track section, the speed measuring device controlling the operation of control valves controlling the braking pressure applied to the car wheels for controlling the speed of the car through the retarder to provide a predetermined speed for the car when leaving the retarder, and wherein reset and cancellation relays controlled by the track relays pass the control of the speed measuring device to the next succeeding pair of car wheels after the leading pair of car wheels leaves the last measuring section only after the succeeding pair of wheels has passed over an entire measuring section, the combination comprising, an occupancy relay, means for energizing said occupancy relay when any of said measuring sections is occupied, a by-pass relay, means for energizing said by-pass relay when the leading pair of car wheels enters a preselected one of said sections after a speed measurement has been made in the preceding section, means for holding said occupancy relay energized when said cancellation relays are energized after the leading pair of car wheels leaves the last measuring section, means for maintaining said by-pass relay energized when said by-pass relay and said occupancy relay are energized, means for operating said control valves to hold the car retarder in its released position when said by-pass relay is deenergized, and means for operating said control valves in accordance with the speed of the car as measured by said speed measuring device when said by-pass relay is energized.

References Cited in the file of this patent

UNITED STATES PATENTS

| | | |
|---|---|---|
| 2,045,989 | Livingston | June 30, 1936 |
| 2,751,492 | Fitzsimmons | June 19, 1956 |